March 27, 1951 K. JONES 2,546,510
ANTIPARALLAX MAPPING DEVICE
Filed Nov. 8, 1948
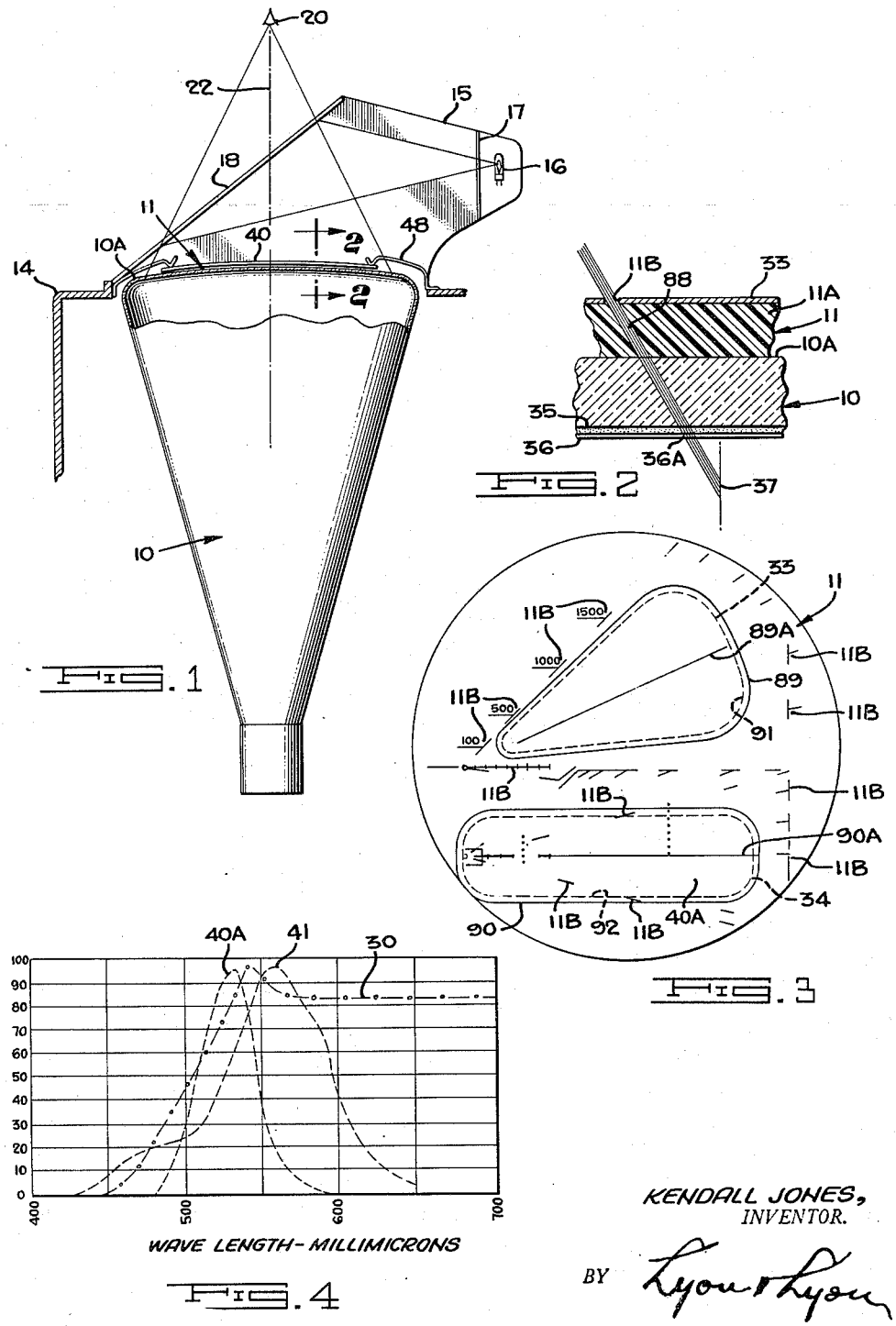
KENDALL JONES,
INVENTOR.
BY Lyon & Lyon
ATTORNEYS Patented Mar. 27, 1951

2,546,510

UNITED STATES PATENT OFFICE 2,546,510

ANTIPARALLAX MAPPING DEVICE

Kendall Jones, Los Angeles, Calif., assignor to Gilfillan Bros., Inc., Los Angeles, Calif., a corporation of California Application November 8, 1948, Serial No. 58,885

8 Claims. (Cl. 177—319)

The present invention relates to an improved antiparallax mapping arrangement especially useful in viewing and comparing cathode ray beam indications together with predetermined markings on maps.

Numerous attempts have been made to superimpose a predetermined marking or map onto the field of view presented by indications produced by a cathode ray tube beam. Such attempts have been made particularly in the field of radar, such as ground controlled approach systems, wherein the map is of the outline of a predetermined landing area for aircraft and such indications are those of aircraft in such area. Such attempts have resulted in rather cumbersome and bulky arrangements which are objectionable for one reason or other, a particular reason being that the arrangements were not free of parallax errors. Such parallax errors are introduced largely because the map is not mounted closely adjacent the viewing surface of the cathode ray tube, because such map does not "form fit" such viewing surface, because of the relatively large thicknesses of material through which light beams were required to travel in viewing the electron-produced image together with the map, because the electron and artificially produced images were only accurately comparable when viewed from a critical angle, because the thickness of the glass envelope of the cathode ray tube itself introduced a large error, as well as other reasons.

It is therefore an object of the present invention to provide an improved mapping arrangement associated with a cathode ray tube in which indications on a map may be accurately compared with electron produced indications in the tube with substantially no parallax errors.

Another object of the present invention is to provide an improved mapping arrangement associated with a cathode ray tube which is characterized by its simplicity, its compactness, inexpensiveness of production, and freedom from parallax errors.

A further object of the present invention is to provide an improved mapping arrangement to which may be added very simply and without the introduction of parallax errors, additional orientation objects such as a small model of an aircraft landing strip.

Still a further object of the present invention is to provide an improved mapping arrangement incorporating a filter or overlay element, the use of which introduces substantially no parallax errors, and such element being adapted to filter the blue and violet components from ambient light and thus permitting use of cathode ray tubes of the long persistency type in conjunction therewith.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 shows a cathode ray tube associated with a mapping arrangement in accordance with the present invention;

Figure 2 is an enlarged sectional view taken on the line 2—2 in Figure 1;

Figure 3 is a top plan view of the map shown in Figure 1 mounted on the cathode ray tube; and Figure 4 is a representation of the wave length transmission characteristics of the map shown in Figure 1 and the spectrum of the phosphorescent radiation produced by electrons in the tube.

The apparatus shown in Figure 1 includes a cathode ray tube 10 having a form fitting filter or map overlay 11 mounted on its viewing surface 10A which extends out of a circular aperture in the cathode ray tube housing 14 with a lamp house 15 mounted on the housing 14.

This lamp house 15 encloses an incandescent lamp 16 whose radiation is allowed to pass through the deep blue filter partition 17 and impinge on the cover member 18 which comprises a half-silvered mirror. This mirror 18 is so positioned with respect to the light source 16 that a person positioning his eye at 20 along the longitudinal axis 22 of the tube 10 may see the map overlay 11 upon which deep blue light from source 16 is directed by the partially reflecting, partially transmitting mirror 18. While the particular arrangement of elements shown herein is preferred, it is understood that certain phases of the present invention may be practiced without the partially transparent, partially reflecting mirror 18. The map overlay 11 comprises a yellow-amber layer or sheet which is substantially opaque to the transmission of deep blue light, as shown on the curve 30 in Figure 4. This sheet 11 may be mounted on a transparent plastic form fitting plastic plate 11A or the sheet 11 may contact the viewing surface 10A of the tube directly, if desired. Preferably, the sheet 11 is a developed photographic emulsion deposited on a transparent plate 11A, the sheet 11 being developed after exposure to light to form the patterns 33 and 34. As a modification, the "sheet" 11 may be a microscopic thin layer on the surface of the transparent plate 11A penetrated by a dye of desired color characteristics, the dye being neutralized at the slits 11B either during or after the dyeing process to thereby form the patterns 33 and 34.

This yellow-amber sheet 11 has cut-out portions or slits 11B therein defining the conventional elevation-range pattern 33 and azimuth-range pattern 34 normally found in present day ground controlled approach systems. These slits 11B, of course, allow the transmission of the deep blue light through the viewing screen of the cathode ray tube onto the sensitized layer 35.

This layer 35 adjacent the glass envelope, in accordance with the practice in present day long persistency tubes, is of so-called yellow-green phosphor which is normally excited only when the electron beam 37 impinges on the inner so-called blue phosphor excitation layer 36. In other words, the layer 35 is now not only subject to excitation upon the electron beam impinging on the inner layer 36 but also phosphorescent or fluorescent effects are likewise produced in layer 35 when the dark blue light from source 16 falls thereon. Thus, the slits 11B are "lit up" with yellow-green phosphorescence of layer 35 responsive to the blue light from source 16 reaching the layer 36, thus defining the patterns or maps shown in Figure 3.

The electron produced images on the tube 10 are visible to an observer at 20 independent of the presence of slits 11B, since the green phosphorescent spectrum 40A and the yellow phosphorescent spectrum 41 produced when the layer 35 is excited by electrons falling on an adjacent spot on layer 36 is such that a large portion of such spectrum is transmitted by the yellow-amber filter 11 having the transmission wave length characteristic 30 shown in Figure 4.

Thus, an observer at 20 sees not only the well "lit up" slits 11B but also the electron-produced images on the scope face.

Of importance is that the yellow-amber map element 11 is opaque to the transmission of light from source 16 (in places other than where it is slitted to define a pattern or map), and is yet transparent to the light produced by excitation of the inner layer 36 by the electron beam and phosphorescence caused by light from source 16.

Another advantage of this type of arrangement is that, for example, a small strip 40 representing an aircraft landing strip may be adjustably secured in correct relative position by a spring clip member 48.

It is noted that the thickness of the mapping element 11 is not critical and as a matter of fact may be spaced so as not to touch the viewing surface of the cathode ray tube.

Since both of these irradiations occur directly in the layer 35, the observer's eye may move in any direction from position 20 without producing any shift in the relative positions of the electron-produced images and the map images. Thus parallax is entirely eliminated.

Attention is now invited to the fact that the thickness of the map overlay and the thickness of the glass of the cathode ray tube itself do not introduce a parallax problem by virtue of the first fact that the relative positions of the lamp 16, mirror 18, overlay 11, and cathode ray tube surface 10A remain fixed during operation, and the second fact that the positions of the slits 11B (see Figure 2) may be so predetermined as to make proper allowance for the angle at which the light rays 88 pass through the map 11 and glass of the cathode ray tube in order to reach the exact spots 36A desired on the sensitive surfaces 35 and 36.

The condition illustrated in Figure 1 happens to place the observer's eye at 20 in coincidence with the image of lamp 16 in reflecting surface 18, and consequently the observer will actually see the map irradiations through the slits of the map.

However, this is not a necessary requirement since the yellow-green phosphorescence is transmitted readily through the yellow-amber filter 11; hence, it is permissible for the dark-blue light to pass through slits 11B at one angle while viewing takes place at an entirely different angle.

By this means, the correct glidepath 89A in elevation and the correct course 90A in azimuth may be set up upon the face of the scope for any suitable position of the GCA equipment relative to the landing strip and the touchdown point thereon. To this end, the overlays 89 and 90 are prepared in a manner similar to overlay 11 with slits 89A and 90A respectively, through which the dark-blue light will pass to produce the desired irradiation on sensitive layers 36 and 35. In order that this dark-blue light may not be obstructed by overlay 11, suitable areas 91 and 92 of the latter are "uncovered."

While the thickness of the overlay 11 induces substantially no parallax error, it is preferably made as thin as practicably possible for sharpness of definition.

It is apparent that the light source 16 may be placed in different positions with respect to the tube 10 than that shown in the drawings, for example, the light source 16 may be mounted on the ceiling of a room in which the tube 10 is disposed in such position that the operator's head is not normally in the light path from the light source to the viewing surface of the cathode ray tube 10.

Referring to the arrangement shown in Figure 1, as a modification, the member 18 may comprise a filter element like the yellow-amber map element 11. In other words, the member 18 may be a filter opaque to the transmission of light from source 16 but yet transparent to the light produced by excitation of the inner layer 36 by the electron beam and phosphorescence caused by the light from source 16 in the cathode ray tube 11.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a cathode ray tube having a viewing surface, an overlay element positioned adjacent to and in front of said viewing surface, said overlay element being opaque but yet optically apertured for transmission of light in a first portion of the spectrum, capable of producing emission from said viewing surface of light in a second portion of the spectrum, to produce a corresponding luminous pattern upon said viewing surface, both the optically apertured and opaque portions of said overlay element being transparent to light in said second portion of the spectrum which corresponds to the wavelength of light emitted upon impingement of the associated cathode ray beam on the internal coating of the tube.

2. In combination, a cathode ray tube having a viewing surface and a long persistency coating of so-called yellow-green phosphor which is normally excited only when the associated electron beam impinges on an inner so-called blue phosphor excitation layer, an overlay element positioned adjacent to and in front of said viewing surface, said overlay element being opaque to but yet optically apertured for transmission of light in a first portion of the spectrum to produce a corresponding pattern upon said viewing surface and the adjacent yellow-green phosphor coating, light from said first portion of the spectrum being capable of causing emission from said coating in a second portion of the spectrum, the opaque and apertured portions of said overlay element being transparent to light in said second portion of the spectrum which corresponds to the wavelength of light emitted upon impingement of the associated cathode ray beam on the inner blue phosphor excitation layer.

3. A cathode ray tube having an internal coating arranged to produce a lighting effect in response to the excitation by deep blue or ultraviolet light, a filter element adjacent the outside surface of said tube, said filter element being opaque to the transmission of light in the deep blue or ultraviolet portion of the spectrum, said filter element having a predetermined pattern formed thereon by removing portions of the filter element to allow the transmission therethrough and onto said coating of said blue or untraviolet light, a partially transparent and partially reflecting surface having its plane at an acute angle with respect to said surface of said tube, said filter element being between said tube and said partially reflecting surface, a light source arranged to transmit blue light onto said filter element after reflection by said reflector; said filter element and said partially transparent and partially reflecting surface being transparent to the light emitted by said coating upon impingement thereon of the electron beam of said cathode ray tube and by impingement of said blue light on said coating.

4. In an antiparallax mapping arrangement incorporating a cathode ray tube having an internal coating for impingement thereon of an electron beam to produce light, a filter element arranged to overlie the outside viewing surface of said tube, said filter element being relatively opaque to the transmission of ultraviolet or deep blue light and having portions therein through which said ultraviolet light may pass and impinge on said internal coating to produce a lighting effect of a wave length other than ultra violet or blue, a blue or ultraviolet light source arranged to transmit light onto said filter element, all portions of said filter element being transparent to the light emitted by said coating upon impingement thereon of said electron beam and transparent to the light emitted by said lighting effect.

5. The combination, in an antiparallax mapping arrangement, a cathode ray tube having a viewing surface and having a coating arranged to emit light upon impingement thereon of the associated electron beam, a filter element mounted adjacent said viewing surface and having a plurality of light opaque and light transparent portions with respect to a predetermined spectral portion of light energy from a light source means, said light transparent portions defining a predetermined pattern on said coating of said tube, a partially transparent and partially reflecting reflector, said filter element being between said viewing surface and said reflector, said light source means being offset with respect to the viewing axis of said tube and arranged to illuminate said filter element after reflection from said reflector to produce a light emissive effect thereby on the coating of said cathode ray tube; said filter element and said partially transparent and partially reflecting reflector being transparent to the light emitted from said coating by impingement thereon of the associated electron beam and light from said light source.

6. In combination, in an antiparallax mapping arrangement, a cathode ray tube having an internal coating sensitive to deep blue or ultraviolet light and producing a light emitting effect in response thereto, a mapping element mounted adjacent to and in the path of vision of the viewing surface of said cathode ray tube with portions thereof respectively transparent to and opaque to the transmission of deep blue or ultraviolet light, deep blue or ultraviolet light source means arranged to illuminate said mapping element, all portions of said mapping element being transparent to the light emitted from said coating upon impingement of the associated electron beam thereon, and all portions of said element being transparent to said light emitting effect.

7. In an arrangement of the character described, electron image producing means having an external viewing surface and an internal coating arranged to emit useful light in a first portion of the visible spectrum in response to the impingement of an associated electron beam thereon, an overlay mounted adjacent to and in the path of view of said viewing surface having portions thereof opaque to and also portions transparent to the transmission of light in a portion of said visible spectrum which is different from said first portion, all portions of said overlay being transparent for the transmission of said light in said first portion of the visible spectrum, means arranged to illuminate said overlay with light having a wave length in said different portion of the visible spectrum, said coating producing fluorescent effects in response to light in said different portion of the spectrum, and all portions of said overlay being transparent to said fluorescent effects.

8. In apparatus of the character described, electron image producing means having an external viewing surface and an internal coating arranged to produce phosphorescent or fluorescent effects when illuminated with light in the blue or ultraviolet range, an overlay mounted closely adjacent to and in the path of view of said external viewing surface having portions thereof transparent to and portions opaque to the transmission of said light in the blue and ultraviolet range, said coating being of the type which emits light characteristically green or greenish-white in response to the impingement thereon of an associated electron beam, said overlay being transparent in all portions thereof to the transmission of said green or greenish-white light, means arranged to project onto said overlay light predominately blue or ultraviolet, and all portions of said overlay being transparent to said phosphorescent or fluorescent effects.

KENDALL JONES.

REFERENCES CITED

The following references are of record in the file of this patent:

UNITED STATES PATENTS

| Number | Name | Date |
|---|---|---|
| 2,222,414 | Kudar | Nov. 19, 1940 |
| 2,251,984 | Cleaver et al. | Aug. 12, 1941 |
| 2,316,550 | Bigalke | Apr. 13, 1943 |
| 2,339,256 | Doncaster | Jan. 18, 1944 |

FOREIGN PATENTS

| Number | Country | Date |
|---|---|---|
| 426,789 | Great Britain | Apr. 5, 1935 |

OTHER REFERENCES

Miller, abstract of application Ser. No. 595,362, published Aug. 30, 1949, 625 O. G. 1,427.